(12) United States Patent
Tan et al.

(10) Patent No.: US 9,499,197 B2
(45) Date of Patent: Nov. 22, 2016

(54) SYSTEM AND METHOD FOR VEHICLE STEERING CONTROL

(71) Applicants: Hua-chuang Automobile Information Technical Center Co., Ltd., New Taipei (TW); Han-Shue Tan, Concord, CA (US); Jihua Huang, Richmond, CA (US)

(72) Inventors: Han-Shue Tan, Concord, CA (US); Jihua Huang, Richmond, CA (US)

(73) Assignees: HUA-CHUANG AUTOMOBILE INFORMATION TECHNICAL CENTER CO., LTD., New Taipei (TW); Han-Shue Tan, Concord, CA (US); Jihua Huang, Richmond, CA (US)

( * ) Notice: Subject to any disclaimer, the term of this patent is extended or adjusted under 35 U.S.C. 154(b) by 56 days.

(21) Appl. No.: 14/515,006

(22) Filed: Oct. 15, 2014

(65) Prior Publication Data

US 2016/0107682 A1  Apr. 21, 2016

(51) Int. Cl.
*B62D 6/00* (2006.01)
*B62D 15/02* (2006.01)
*B60W 30/18* (2012.01)
*B60W 30/00* (2006.01)
*G05D 1/02* (2006.01)
*B60W 30/095* (2012.01)

(52) U.S. Cl.
CPC ............... *B62D 6/00* (2013.01); *B60W 30/00* (2013.01); *B60W 30/18163* (2013.01); *B62D 15/025* (2013.01); *B62D 15/0265* (2013.01); *G05D 1/0212* (2013.01); *B60T 2201/022* (2013.01); *B60T 2201/08* (2013.01); *B60W 30/095* (2013.01); *B60W 2550/10* (2013.01); *G05D 2201/0213* (2013.01)

(58) Field of Classification Search
CPC ............ B62D 15/0265; B62D 15/025; B62D 15/0255; B62D 6/00; B60T 2201/022; B60T 2201/024; B60T 2201/08; B60T 2201/87; B60W 10/20; B60W 30/095; B60W 2550/10; B60W 30/18163; B60W 30/00; B60R 21/0132; G05D 1/0212; G05D 2201/0213

See application file for complete search history.

(56) References Cited

U.S. PATENT DOCUMENTS

| | | | | |
|---|---|---|---|---|
| 5,913,375 A * | 6/1999 | Nishikawa | ............... | B62D 6/00 180/167 |
| 8,140,344 B2 * | 3/2012 | Kameyama | ........ | B60H 1/00742 382/104 |
| 8,762,043 B2 * | 6/2014 | Eidehall | ............. | B62D 15/0265 701/301 |
| 2004/0193374 A1 * | 9/2004 | Hac | .................... | B60K 31/0008 701/301 |

(Continued)

*Primary Examiner* — Jason Holloway
(74) *Attorney, Agent, or Firm* — Muncy, Geissler, Olds & Lowe, P.C.

(57) ABSTRACT

A method for steering control of a vehicle having an actuator which turns steered wheels of the vehicle. The steering control method includes obtaining a location of a target point at a look-ahead distance away from the vehicle based on a maneuver the vehicle is performing, predicting a forward location of the vehicle at the look-ahead distance away from the vehicle, determining a distance between the location of the target point and the forward location, computing a normalized error by dividing the distance with the look-ahead distance, and determining a steering control command based on an integration of the normalized error. The actuator then turns the steered wheels of the vehicle according to the steering control command so as to steer the vehicle to perform various maneuvers.

18 Claims, 10 Drawing Sheets

(56) References Cited

U.S. PATENT DOCUMENTS

| | | | |
|---|---|---|---|
| 2006/0235753 A1* | 10/2006 | Kameyama | B60H 1/00742 705/15 |
| 2007/0192038 A1* | 8/2007 | Kameyama | G01C 21/3641 702/19 |
| 2010/0082195 A1* | 4/2010 | Lee | B62D 15/025 701/25 |
| 2011/0144859 A1* | 6/2011 | Suk | B60W 30/12 701/33.4 |
| 2014/0032049 A1* | 1/2014 | Moshchuk | B62D 15/0265 701/42 |

* cited by examiner

SYSTEM AND METHOD FOR VEHICLE STEERING CONTROL

BACKGROUND

Technical Field

The present invention relates to methods and systems for vehicle steering control that allows a vehicle to automatically perform various maneuvers including lane keeping, lane changes, left and right turns, as well as obstacle avoidance.

Related Art

In recent years, technologies that free drivers from tedious driving tasks and allow vehicles to operate automatically are being developed. One critical technology is the vehicle steering control that allows a vehicle to automatically perform various maneuvers in order to go from a source location to a destination. The typical maneuvers include lane keeping (in which the vehicle follows a lane and maintains its position in the lane), lane changes (in which the vehicle changes from one lane to another in order to maintain a desired speed, or to merge into or exit a freeway, or to prepare for left or right turns), left and right turns, as well as obstacle avoidance (in which the vehicle steers away from an obstacle in the lane to avoid hitting the obstacle).

To accomplish these various maneuvers, a typical vehicle control systems involves at least two levels or parts: path planning and path following. In path planning, the vehicle control system first plans or generates a desired path, by following which the vehicle can execute the maneuver. Typically for the lane keeping maneuver, the lane the vehicle is following naturally becomes the desired path. In all other maneuvers, the desired path needs to be generated according to the specific maneuver. For example, a desired path for a lane change is significant different from a desired path for a left turn or a right turn. In other words, different patterns or formulas are used to generate the desired paths for different maneuvers. Furthermore, the desired path also depends on factors such as the vehicle speed; for example, the higher the speed, the longer the desired path for a lane change. The desired path is typically constructed as one or multiple segments of smooth curves, which are represented mathematically using splines, polynomials, etc. During the execution of the maneuvers, the vehicle control system uses the desired path as references for the steering control. Therefore, the system needs to either store the desired path generated before the maneuver or continuously generate a new desired path during the maneuver execution.

In path following, the system determines the steering control command based on the desired path and the vehicle states and turns the steered wheels accordingly so that the vehicle can follow the desired path. The approaches in determining the steering control command can be divided into two categories. The approaches that fall into the first category typically involve (1) estimating or obtaining the curvature of the desired path, the current lateral deviation of the vehicle from the desired path, and the relative heading angle between the vehicle heading and the tangent direction of the desired path, and (2) computing the steering control command as a combination of a feed-forward term based on the curvature and a feedback term based on the current lateral deviation and the relative heading angle. The approaches that fall into the second category typically involve (1) predicting a path the vehicle will likely travel along based on vehicle states, (2) determining an error between the predicted path and the desired path at a distance ahead, and (3) computing the steering control command as a linear function of the error or an integration of the error.

The existing prior-art vehicle steering control systems have several limitations. First, the necessity to plan or generate a desired path as a reference for steering control increases system complexity and computation load. As the desired paths differ for different maneuvers, the system needs to store all the different patterns of the desired paths for all the different maneuvers and to retrieve the appropriate pattern based on the maneuver to be executed. The system also needs to generate the actual desired path using the retrieved pattern based on the vehicle speed, road geometry, and other factors. For example, the different patterns can be represented by different sets of equations, where each set of equations corresponds to a specific type of maneuvers. The system retrieves the appropriate set of equations based on the maneuver to be performed and further determines the parameters of the retrieved set of equations based on factors such as the vehicle speed and road geometry. The retrieved set of equations with the determined parameters then defines the desired path for the maneuver. Moreover, if the system is designed to continuously update the desired path during the maneuver, the computation level increases; if the system is designed to store the desired path, the system needs to allocate memory for the storage and to locate the vehicle current position to the corresponding location in the desired path. In short, the need to generate a desired path increases the system complexity as well as computation and storage demands.

Second, each category of the approaches of path following has its limitations. In the first category where the steering control command includes a feed-forward term and a feedback term, the curvature needs to be estimated or pre-stored in a digital map (which may result in a large demand on storage or communication unless the vehicle operates only on limited, pre-determined routes). In environments where the curvature is fast changing, one further question is which curvature (i.e., curvature at vehicle current location or ahead of vehicle) should be estimated and used. The decision also needs to take into consideration of vehicle speed. Moreover, since the steering control command is a combination of a feed-forward term and a feedback term, the determination of the weights on both terms so as to optimize the performance becomes another issue, and the weights likely need to be changed when vehicle states and operating environment change.

The approaches in the second category have the advantage of being relatively straightforward: they do not need to estimate curvature or determine weights. Although they need to predict a path the vehicle is likely to travel along, two simple predictions are typically used: the primary prediction and the secondary prediction. Using the primary prediction, the predicted path is simply a straight line in the direction of vehicle heading angle. In other words, the primary prediction assumes the vehicle will maintain its current heading angle in the predicted time frame. The steering angle command $\delta$ is then given by multiplying an error e, which is the distance between the predicted path and the desired path at a predetermined forward distance, by a predetermined proportional constant gain k: $\delta = k \cdot e$. Using the second prediction, the path prediction is based on the vehicle's current direction and running conditions. The error e between the predicted path and the desired path at a predetermined forward distance is then integrated and the resultant value is multiplied by the proportional constant gain k to derive the steering angle command: $\delta = k \cdot (\Sigma e)$.

Although the approaches in the second category are relatively simple, they suffer from serious performance issues. The control using the primary prediction can achieve satisfactory performance when the desired path is nearly straight; however, its performance is far from satisfaction when the vehicle negotiates sharp curves. Under the control based on the secondary prediction, the vehicle could follow a desired path with satisfactory accuracy under some conditions, e.g., at low or moderate speeds and on relatively mild curves. However, with a predetermined (i.e., constant) forward distance and a predetermined (i.e., constant) gain, the control would become unstable at high speeds and the vehicle would be out of the path when negotiating very tight curves.

To overcome the above limitations, some prior art methods employ multiple controllers and switch the control among them. In one prior art, three controllers were designed, the first one is a linear function of the error using the primary prediction, the second and third ones are the integration of the error using the secondary prediction. The difference between the second and third controllers is that the second one uses a pre-determined (i.e., constant) smaller forward distance (i.e., a near distance) while the third one uses a pre-determined (i.e., constant) larger forward distance (i.e., a far distance). When the vehicle is traveling on a straight road, the first controller is used, when the vehicle is negotiating a very tight curve, the second controller is used, otherwise, the third one is used. However, as this method requires switching among different controllers, the smoothness of the control during switching is sacrificed. If additional mechanisms are implemented to improve the smoothness during controller switching, the system complexity increases. Moreover, this method also needs to ensure the switching decision making can make the correct selection of controllers under all conditions.

It is therefore desirable to have steering control methods and systems that can overcome the limitations in both the path planning and path following of the prior-art steering control methods and systems. The present invention provides such steering control methods and systems.

SUMMARY

In accordance with an embodiment of the present invention, a method for steering control is provided for a vehicle to perform various maneuvers. The vehicle has an actuator installed, which turns the steered wheels of the vehicle. The steering control method comprises obtaining a location of a target point at a look-ahead distance away from the vehicle, predicting a forward location of the vehicle at the look-ahead distance away from the vehicle, determining a distance between the location of the target point and the forward location, computing a normalized error by dividing the distance with the look-ahead distance, and determining a steering control command based on an integration of the normalized error. The steering control command can be determined by multiplying the integration of the normalized error with a (constant or dynamic) gain. The actuator then turns the steered wheels of the vehicle according to the steering control command so as to steer the vehicle to perform various maneuvers.

The steering control method determines the look-ahead distance based on at least one of the following: vehicle speed, vehicle rotating speed, vehicle lateral acceleration, vehicle steering angle, a curvature of the lane, the normalized error, the distance between the location of the target point and the forward location, the distance to the lane boundary if the vehicle is following the lane, the maneuver the vehicle is performing, and the location of the obstacle if the maneuver is obstacle avoidance. In one embodiment, the look-ahead distance is a linear function of vehicle speed such that the look-ahead distance increases as the vehicle speed increases. In another embodiment, the look-ahead distance is a function of the vehicle speed and vehicle rotating speed such that the look-ahead distance increases as the vehicle speed increases and decreases as the vehicle rotating speed increases. The look-ahead distance may also decrease when the normalized error is relatively large and increase when the normalized error is relatively small. Similarly, when the distance between the location of the target point and the forward location is relatively large (or small), the look-ahead distance may decreases (or increases) accordingly. In addition, the maneuver can be incorporated as well; for example, the look-ahead distance can be reduced for left and right turns and the look-ahead distance can be longer (or shorter) for lane change maneuvers depending on a preferred distance (or time) to complete the lane change. Finally, if the vehicle is performing a lane keeping maneuver, the look-ahead distance may decreases when the vehicle is about to cross the lane boundary and increases when the vehicle is travelling close to the lane center.

In one embodiment, to obtain the location of the target point, the steering control method first locates the target point based on the maneuver the vehicle is performing. When the vehicle is performing a lane keeping maneuver, the steering control method locates the target point at an offset, including zero offset, to a lane centerline of the lane the vehicle is traveling in. When the vehicle is performing a lane change maneuver, the steering control method locates the target point at an offset, including zero offset, to a lane centerline of the lane the vehicle is changing to. When the vehicle is performing a left turn maneuver or a right turn maneuver, the target point is located at an offset, including zero offset, to a lane centerline of the lane the vehicle is turning to. When the vehicle is performing an obstacle avoidance maneuver to avoid obstacles in its current lane, the target point is located at either the left or right adjacent lane depending on which lane is available. Subsequently, the steering control method then computes the location of the target point based on the lane centerline, the offset, and the look-ahead distance.

In one embodiment, the steering control method predicts the forward location of the vehicle by assuming that the vehicle maintains its current speed and rotating speed while traveling the look-ahead distance, where the current rotating speed is determined based on the vehicle current yaw rate and/or the vehicle current steering angle. Alternatively, the steering control method predicts the forward location of the vehicle by assuming the vehicle maintains its current speed and steering angle while traveling the look-ahead distance. Geometric relationships, vehicle kinematic models, or vehicle dynamic models (such as the bicycle model) can be employed to predict the vehicle forward location based on the above assumptions.

The disclosed steering control methods have two main advantages over prior-art methods. First, the disclosed steering control methods use target points (or a target line) located at an offset (including zero offset) to the centerline of the lane the vehicle is traveling in (for lane keeping maneuvers) or changing to (for other maneuver) as references for control. Thus, the disclosed methods no longer need to plan or generate various desired paths for different maneuvers and driving scenarios. Second, the disclosed steering control methods normalize the error between the predicted location and the target points before integrating the normalized error and multiplying the integrated value with a feedback gain. The normalization of the error allows the disclosed steering control to increase the look-ahead distance as vehicle speed increases without sacrificing system stability; it also allows the disclosed steering control to reduce the look-ahead distance without reducing the feedback gain so as to provide adequate steering for the vehicle to negotiate tight curves. With these two advantages, the disclosed steering control methods provide a straightforward mechanism to steer the vehicle in various maneuvers and driving conditions with high accuracy while maintaining stability.

In accordance with an embodiment of the present invention, a modified method from the afore-mentioned steering control method is also provided. Instead of obtaining a target point at a look-ahead distance ahead of the vehicle, this method obtains a target line ahead of the vehicle based on a maneuver the vehicle is performing. This method then predicts a forward location of the vehicle at the look-ahead distance ahead the vehicle and computes the distance from the forward location of the vehicle to the target line. The steering control command is then determined by normalizing the distance with the look-ahead distance to compute a normalized error, integrating the normalized error, and multiplying the integration with a gain to derive the steering control command. Accordingly, the actuator turns the steered wheels according to the steering control command so as to steer the vehicle to perform the maneuver.

In one embodiment, the method obtains the target line by first locating the target line based on the maneuver. The target line is at an offset, including zero offset, to a lane centerline of the lane the vehicle is traveling in when the vehicle is performing a lane keeping maneuver; the target line is at an offset, including zero offset, to a lane centerline of the lane the vehicle is changing to when the vehicle is performing a lane change maneuver; the target line is at an offset, including zero offset, to a lane centerline of the lane the vehicle is turning to when the vehicle is performing a left turn maneuver or a right turn maneuver. The offset could be a position offset and/or an angle offset. Subsequently, the method computes the location of the target line based on the corresponding lane centerline and the offset.

The present invention further discloses a lateral control system based on the disclosed steering control methods. Installed on a vehicle that includes steered wheels for controlling the steering of the vehicle, the lateral control system comprises a road detection means that provides information of the road in front of the vehicle, a speed sensor for providing a vehicle speed signal, a steering angle sensor for providing a steering angle signal, a processor for computing a steering angle command, and at least one steering actuator for turning the steered wheels according to the steering angle command so as to steer the vehicle to perform the maneuver. The processor is connected to the road detection means to receive the information of the lane and connected to the speed sensor and the steering angle sensor to receive the vehicle speed signal and the steering angle signal, respectively. The steering actuator is connected to the steering angle sensor to receive the steering angle signal and connected to the processor to receive the steering angle command.

In one embodiment, the road detection means comprises an image sensor for taking an image of the view ahead of the vehicle and an image processing unit for calculating a road shape as the road information from the image taken by the image sensor. In another embodiment, the road detection means comprises a satellite navigation system for determining a location of the vehicle, a digital map, and a processing unit for mapping the location of the vehicle into the digital map and providing the road information ahead the location of the vehicle. In a third embodiment, the road detection means comprises a laser scanner for sending laser pulses and capturing lights reflected from objects in front of the vehicle and a processing unit for determining a road shape as the road information from the reflected lights.

The processor determines the steering angle command by determining a look-ahead distance, computing a location of a target point at the look-ahead distance ahead the vehicle, predicting a forward location of the vehicle, calculating a distance between the location of the target point and the forward location, computing a normalized error by dividing the distance with the look-ahead distance, and integrating the normalized error.

In one embodiment, the processor determines the look-ahead distance based on at least one of the following: vehicle speed, vehicle yaw rate, vehicle lateral acceleration, vehicle steering angle, a curvature of the lane, a distance to the lane boundary, a distance to an obstacle, the normalized error, the distance between the location of the target point and the forward location, and a maneuver the vehicle is performing. The processor then determines the location of the target point by estimating a lane centerline based on the road information from the road detection means and calculating the location of the target point based on the lane centerline, an offset, and the look-ahead distance, wherein the target point is located at the offset, including zero offset, to the lane centerline and at the look-ahead distance ahead of the vehicle.

The processor predicts the forward location of the vehicle by first estimating a vehicle rotating speed based on the steering angle signal and then computing the forward location based on the vehicle speed signal, the vehicle rotating speed, and the look-ahead distance. In another embodiment, the lateral control system further comprises a rotating speed sensor for providing a rotating speed signal of the vehicle and the processor predicts the forward location of the vehicle based on the speed signal from the speed sensor and the rotating speed signal from the rotating speed sensor.

In a further embodiment, the lateral control system is connected to a maneuver decision unit installed on the vehicle and the processor receives a maneuver command (such as lane keeping, lane changing, left turn, right turn, and avoiding an obstacle) from the maneuver decision unit. Based on the maneuver command, the processor selects a target line, at which the target point is located, and computes the location of the target point based on the target line and the look-ahead distance. The target line is at an offset (including zero offset) to the centerline of the lane the vehicle is traveling in or changing to depending on the maneuver command.

The disclosed steering control systems inherit the advantages of the disclosed steering control methods. These control systems can steer the vehicle to perform various maneuvers while achieving high accuracy and maintaining stability in various driving conditions.

BRIEF DESCRIPTION OF THE DRAWINGS

Further details of the present invention are explained with the help of the attached drawings in which:

FIG. 8 shows the block diagram of a steering control system on board a vehicle, which automatically steers the vehicle to follow the lane the vehicle is in.

FIG. 9 shows the block diagram of another embodiment of the steering control system on board a vehicle, which automatically steers the vehicle to follow the lane the vehicle is in.

DETAILED DESCRIPTION

The present invention discloses a method and system for vehicle steering control that performs various maneuvers without planning a desired path. Instead, a target at the lane the vehicle is following, or changing to, or turning into is used as a reference point for control. To help illustrate the difference between the present invention and prior-art methods, FIG. 1 shows a prior-art method in which a desired path is planned for a lane change maneuver, while FIG. 2 shows the target points that are used as references for the steering control to execute a lane change maneuver in one embodiment of the present invention.

Figure 1:
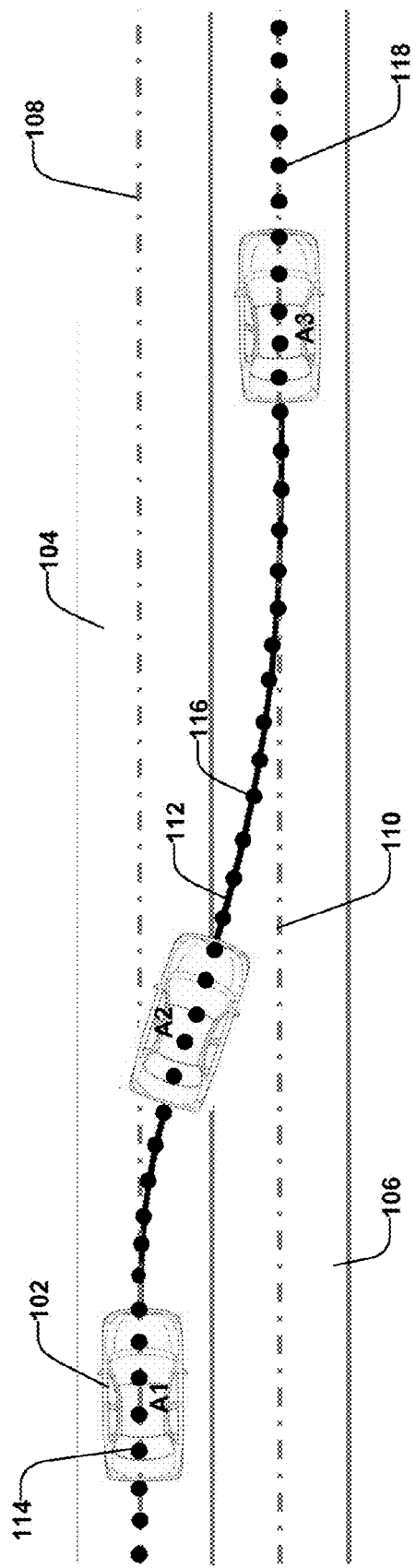
FIG. 1 shows a prior-art steering control method, in which a desired path is planned for a lane change maneuver.

In FIG. 1, a vehicle 102 is under the control of a prior-art automatic steering control system (not shown). Before reaching location A1, the vehicle travels in lane 104 along its lane centerline 108 and the prior-art system uses the lane centerline 108 as its desired path and determines the steering control command based on the reference points 114 along the desired path (i.e., the lane centerline 108). At location A1, the vehicle needs to make a lane change to lane 106. The prior-art automatic steering control system then plans or generates a desired path 112, by following which the vehicle can change to lane 106 smoothly. The prior-art system then uses the reference points 116 located along the desired path 112 to determine the steering control command so as to guide the vehicle along the desired path 112. As the vehicle completes its lane change at location A3, the prior-art system changes the desired path to be the lane centerline 110 of lane 106; accordingly the reference points 118 along the desired path are then located along the lane centerline 110 for the subsequent lane keeping maneuver.

Figure 2:
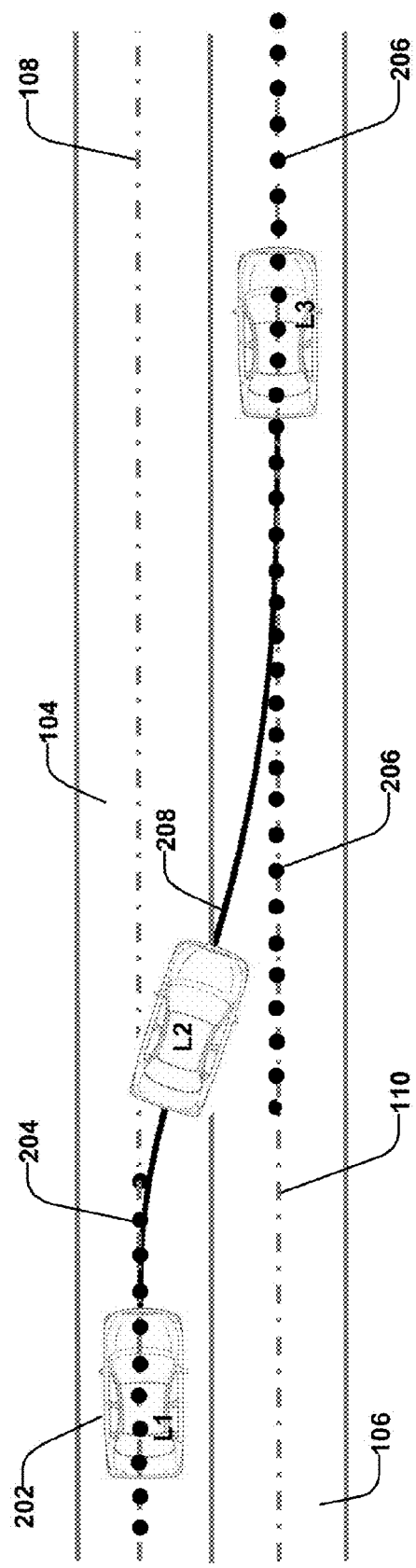
FIG. 2 shows the target points that are used as references for the steering control to execute a lane change maneuver in one embodiment of the present invention.

In FIG. 2, a vehicle 202 is under the automatic steering control system (not shown) of one embodiment of the present invention. Similar to the scenario in FIG. 1, the vehicle 202 first follows lane 104 before reaching the location L1; the vehicle then makes a lane change to lane 106 and continues following lane 106 after the lane change. Unlike the prior-art system, the disclosed automatic control system does not plan a desired path for either the lane change or the lane keeping. Instead, the automatic system directly uses target points located along the lane the vehicle is traveling in or changing to as references for the steering control. Before the location L1, the vehicle 202 performs the lane keeping maneuver; thus, the target points 204 are located along lane 104, which is the lane the vehicle is traveling in. In one embodiment, the target points 204 are located along the lane centerline 108; in another embodiment, the target points 204 are located at an offset to the lane centerline 108. At and after the location L1, the vehicle 202 performs the lane change maneuver and the target points 206 are then located along lane 106, which is the lane the vehicle 202 is changing to. In one embodiment, the target points 206 are located along the lane centerline 110; in another embodiment, the target points 206 are located at an offset to the lane centerline 110. By using these target points as references for control, the disclosed automatic steering control system can guide the vehicle 202 from lane 104 and lane 106 smoothly; that is, the actual vehicle path 208 is an after-fact result of the steering control rather than a planned path in advance of the lane change. Upon completion of the lane change, the vehicle 202 then follows lane 106, thus, the target points 206 remain located along lane 106.

Figure 3:
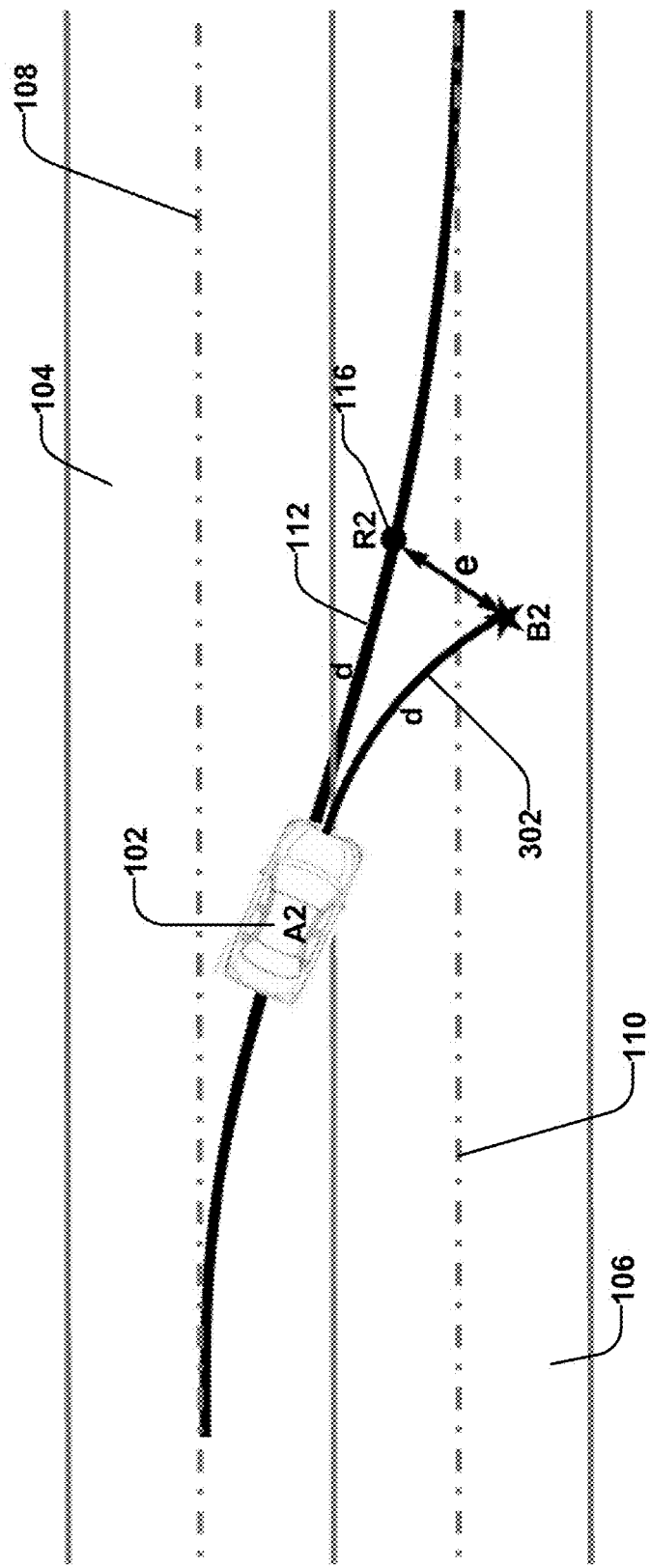
FIG. 3 shows a prior-art steering control that determines the steering control command by using the references points along the desired path.
Figure 4:
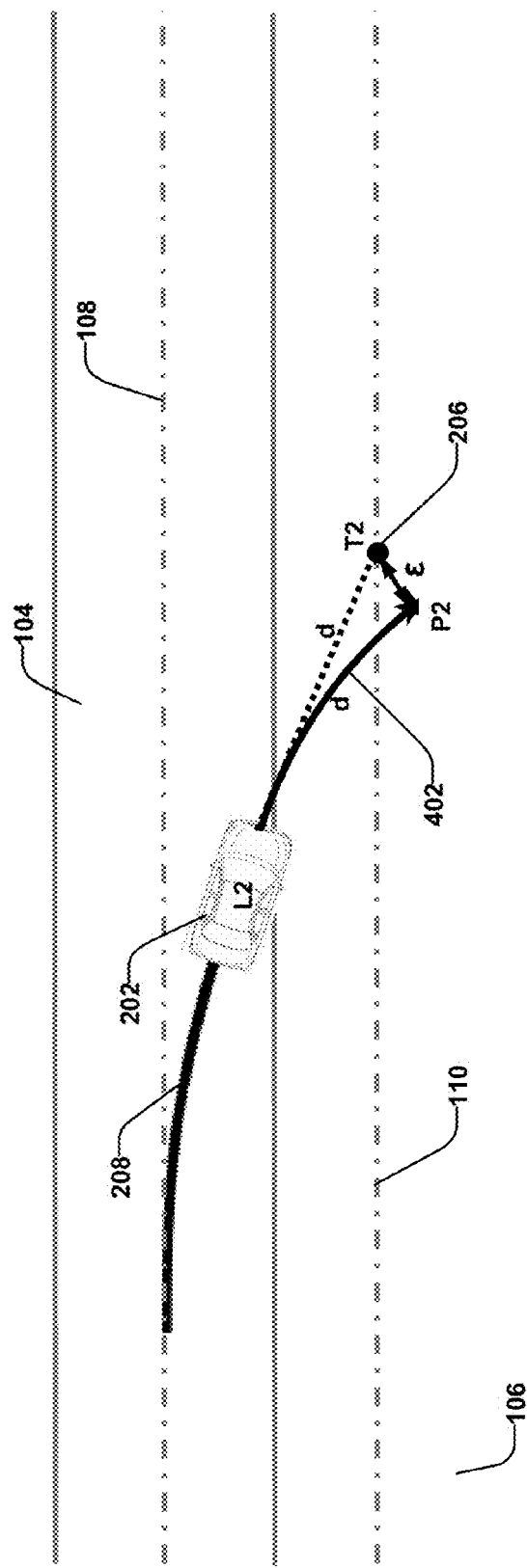
FIG. 4 shows the steering control that uses the target points along the lane the vehicle is traveling in or changing to according to one embodiment of the present invention.

The differences between the present invention and prior-art methods in determining the steering control command can be made evident by FIG. 3 and FIG. 4. FIG. 3 shows a prior-art method that uses the references points along the desired path. In FIG. 3, the vehicle 102 is at location A2 in the middle of the lane change. As described in FIG. 1, the prior-art steering control method uses references points 116 located along the desired path 112 as references for control. At each time instance t, the prior-art steering control method uses a specific reference point that is at a predetermined distance ahead along the desired path. This predetermined distance can be represented by a look-ahead distance d. Thus, when the vehicle 102 is at location A2, the specific reference point 116 used to determine the steering control command is R2. The prior-art steering control method then predicts a forward location of the vehicle using either the primary prediction or the secondary prediction. As an example, FIG. 3 illustrates the case where the secondary prediction is used. The forward location of the vehicle is thus B2, which is ahead of the vehicle by the same look-ahead distance d. The prior-art steering control then computes e(t), the distance between the reference point R2 and the forward location B2. Accordingly, the steering control command is then computed by $\delta(t)=k \cdot (\Sigma e(t))$. It is worth noticing that the vehicle 102 is not centered on the desired path at location A2 and its heading angle is not at the tangent direction of the desired path. This is because the actual path or trajectory of the vehicle usually deviates from the desired path since there are always some residue errors.

FIG. 4 shows the steering control according to one embodiment of the present invention. In FIG. 4, the vehicle 202 is at location L2 in the middle of the lane change. As described in FIG. 2, the steering control uses target points 206 located at the lane the vehicle is traveling in (for lane keeping) or changing to (for lane changes) as references for control. Since the vehicle 202 is performing a lane change, the target points 206 are located at lane 106, either along the lane centerline 110 or at an offset to the lane centerline 110. At each time instance t, the steering control method uses a specific target point that is at a look-ahead distance d(t) ahead. (One advantage of the disclosed method is that it allows the look-ahead distance d to vary without causing instability or sacrificing performance. This advantage will be further described later.) Thus, when the vehicle 202 is at location L2, the specific reference point 206 used to determine the steering control command is T2. In one embodiment, the steering control method then predicts a forward location of the vehicle by assuming the vehicle maintains its current speed and rotating speed (i.e., yaw rate). The forward location of the vehicle is thus P2, which is ahead of the vehicle by the same look-ahead distance d(t). The steering control then computes an error term $\epsilon(t)$, which is the distance between the target point T2 and the forward location P2. Subsequently, the disclosed steering control method further normalizes the error term $\epsilon$ by dividing it with the look-ahead distance d(t) and then integrates it: $\delta(t) = k(t) \cdot (\Sigma (\epsilon(t)/d(t)))$.

By normalizing the error term $\epsilon$ with the look-ahead distance d(t), the disclosed steering control method has great advantages over the prior-art methods. As mentioned earlier, the prior-art steering control based on the primary prediction cannot achieve satisfactory performance when the vehicle negotiates sharp curves. The primary prediction assumes that the vehicle runs straight, which is far from the reality when the desired path has sharp curves. Using the secondary prediction, the prior-art steering control becomes unstable at high speeds and cannot maintain the vehicle along the desired path when the curvature is very tight. (In control theory, a control system needs to have adequate phase margin and gain margin in order to be stable. To achieve an adequate phase margin, the control system needs to have adequate phase lead. To achieve an adequate gain margin, the feedback gain of the control system should not exceed certain values dictated by the gain margin.) At the high speeds, the look-ahead distance that works well at lower speeds is too short to provide adequate phase lead into the steering control system; the lack of adequate phase lead would cause the system to be prone to instability. One possible remedy is to increase the look-ahead distance as the speed increases; however, given the same desired path and the predicted path, the longer the look-ahead distance, the larger the error term e. As a result, increasing the look-ahead distance would essentially increase the feedback gain, thus causing the control system to lose its gain margin and even become unstable.

The disclosed steering control predicts a forward location of the vehicle by assuming the vehicle maintain its current yaw rate (or steering angle); as a result, the prediction works regardless the vehicle is going straight or negotiating sharp curves. More importantly, the error term $\epsilon$ is normalized by the look-ahead distance and the resultant value is integrated to compute the steering control command. At higher speeds, the disclosed steering control can increase the look-ahead distance d to introduce more phase lead to the system. Although the increased look-ahead distance also results in a larger error term, the normalization of the error term (i.e., dividing the error term by the look-ahead distance) removes the negative effects prior-art methods have when they increase the look-ahead distance. In short, by normalizing the error term, the disclosed steering control can dynamically adjust the look-ahead distance d(t) so as to maintain the stability and performance over a wide range of vehicle speeds.

As described earlier, another limitation of the prior-art steering control under secondary prediction is their inability to maintain the vehicle along the desired path when the curvature is very tight. A look-ahead distance that works on straight paths or paths with mild curves may be too long on paths with sharp curves; as a result, the reference points are too far away to capture the actual curve of the desired path. A possible remedy is to reduce the look-ahead distance when the vehicle negotiates tight curves; however, given the same desired path and the predicted path, the shorter the look-ahead distance, the smaller the error term e. As a result, reducing the look-ahead distance would essentially reduce the feedback gain, causing the prior-art control system unable to provide adequate steering control commands to maintain the vehicle along the tight curves.

This limitation of prior-art methods is also overcome by the normalization of the error term in the disclosed steering control. When negotiating tight curves, the disclosed steering control system can reduce the look-ahead distance. Although the reduced look-ahead distance results in a smaller term $\epsilon$, the feedback gain is not affected much since the smaller error term is normalized by the smaller look-ahead distance. As a result, the disclosed steering control system has an adequate feedback gain to provide adequate steering for the vehicle to negotiate tight curves.

In summary, the disclosed steering control has two main advantages over the prior-art methods. First, the disclosed steering control uses target points located at the lane the vehicle is traveling in (for lane keeping maneuvers) or changing to (for other maneuver) as references for control. Thus, the disclosed steering control no longer needs to plan or generate various desired paths for different maneuvers and driving scenarios. Second, the disclosed steering control normalizes the error between the predicted location and the target points, integrates the normalized error, and then multiplies the integrated value with a feedback gain to compute the steering control command. The normalization of the error allows the disclosed steering control to increase the look-ahead distance as vehicle speed increases without sacrificing system stability; it also allows the disclosed steering control to reduce the look-ahead distance without reducing the feedback gain so as to provide adequate steering for the vehicle to negotiate tight curves. Analyses based on control theories reveal that the normalization of the error results in the introduction of two open-loop zeroes that have a desirable, constant damping ratio regardless of the vehicle speed (and road curvature). Since the poles of the closed-loop control system approach the open-loop zeroes, the normalization of the error thus allows the closed-loop system to sustain a higher feedback gain without sacrificing stability in a wide range of speeds. In short, the disclosed steering control provides a straightforward mechanism to steer the vehicle in various maneuvers and driving conditions with high accuracy while maintaining stability.

Figure 5:
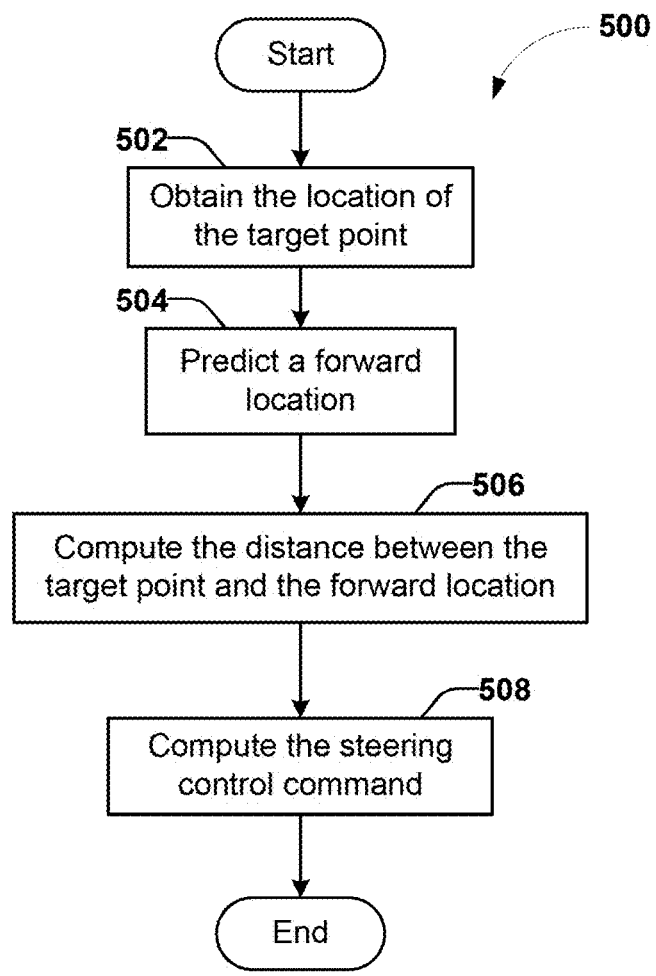
FIG. 5 is a flowchart showing the process involved in one embodiment of the steering control based on the target points.

FIG. 5 is a flowchart showing the process 500 involved in one embodiment of the steering control method. The process 500 resides in a processor onboard a vehicle and is set to run in real time at a pre-defined processing cycle, e.g., every 10 ms. The process 500 starts with obtaining the location of the target point in step 502. The process 500 first determines the lane the target point should be located at according to the maneuver the vehicle is performing. When the vehicle is performing a lane keeping maneuver, the target point is located at the lane the vehicle is traveling in. When the vehicle is performing a lane change maneuver, the target point is located at the lane the vehicle is changing to (as shown in FIG. 2 and FIG. 4). When the vehicle is performing a left turn or right turn maneuver, the target point is located at the lane the vehicle is turning to. When the vehicle is performing an obstacle avoidance maneuver to avoid obstacles in its current lane, the target point is located at either the left or right adjacent lane depending on which lane is available. In one embodiment, the target point is always located at the lane centerline; in another embodiment, the target point is located at an offset to the lane centerline, where the offset is dynamic and can be zero or non-zero.

Once the process 500 determines the lane the target point is located at, it further determines a look-ahead distance based on at least one of the following: vehicle speed, vehicle rotating speed, vehicle lateral acceleration, vehicle steering angle, the curvature of the lane, a distance to the lane boundary, a distance to an obstacle, the normalized error, the distance between the location of the target point and the forward location, the maneuver the vehicle is performing, and the location of the obstacle if the maneuver is obstacle avoidance. In one embodiment, the look-ahead distance is a function of vehicle speed, e.g., $d(t)=a \cdot v(t)$, where d is the look-ahead distance, v is the vehicle speed, a can be a constant or a varying gain. In another embodiment, a lower limit of the look-ahead distance can be incorporated as well: $d(t)=\max(a \cdot v(t), d_{min})$. That is, if $a \cdot v(t) > d_{min}$, $d(t)=a \cdot v(t)$; otherwise, $d(t)=d_{min}$. In a further embodiment, $d(t)$ is a function of the vehicle speed and vehicle rotating speed: $d(t)=f(v(t), \omega(t))$, where $\omega(t)$ is the vehicle rotating speed (i.e. yaw rate). The function $f(v(t), \omega(t))$ is devised such that the look-ahead distance d increases as the vehicle speed increases and $d(t)$ decreases as the vehicle rotating speed increases. In another embodiment, the steering angle is used in place of the rotating speed to determine the look-ahead distance $d(t)$. In yet another embodiment, the look-ahead distance $d(t)$ is determined based on the vehicle speed and the curvature of the lane, and the larger the curvature, the shorter the look-ahead distance $d(t)$. The look-ahead distance may also decreases when the normalized error gets relatively large and increases as the normalized error gets relatively small. Similarly, when the distance between the location of the target point and the forward location is relatively large (or small), the look-ahead distance may decreases (or increases) accordingly. (Since in each processing cycle the look-ahead distance is determined before the computation of the normalized error or the distance between the target point and the forward location, the normalized error or the distance computed from the previous processing cycle can be used in the determination of the look-ahead distance.) Finally, if the vehicle is conducting a lane-keeping maneuver, the look-ahead distance may decreases when the vehicle is about to cross the lane boundary (i.e., relatively far away from the lane center) and increases when the vehicle is travelling close to the lane center. In addition, the maneuver can be incorporated as well; for example, the look-ahead distance $d(t)$ can be reduced for left and right turns. For a lane change maneuver, the look-ahead distance can be increased if a longer distance (or longer time duration) is preferred for the lane change; or the look-ahead distance can be reduced if the lane change is preferred to be completed in a shorter distance.

With the lane and the look-ahead distance $d(t)$ determined, the process 500 computes the location of the target point as a location at the centerline (or at an offset to the centerline) of the lane, whose distance to the vehicle equals to the look-ahead distance $d(t)$. In one embodiment, the location is obtained by solving two equations: the first equation represents the lane centerline (or an offset centerline) and the second equation represents that the distance between the target point and the vehicle equals the look-ahead distance.

Subsequently, in step 504, the process 500 predicts a forward location of the vehicle, which is also at the look-ahead distance, $d(t)$, ahead of the vehicle. The prediction is based on an assumption that the vehicle will maintain its current vehicle speed and rotating speed while traveling the look-ahead distance. In other words, the vehicle travels along an arc with the radius of $R=v(t)/\omega(t)$ (where v(t) is the vehicle speed and $\omega(t)$ is the rotating speed or yaw rate) and the arc length as $d(t)$. The end point of the arc is then the predicted forward location. Thus, based on a simple geometric relationship, the location of the forward location can be obtained. In one embodiment the vehicle yaw rate is directly used in the prediction, while in another embodiment the rotating speed is estimated using the steering angle.

In step 506, the distance between the target point and the forward location is computed as the error term 40. Subsequently in step 508, the process 500 determines the steering control command by (1) normalizing the error term $\epsilon(t)$ with the look-ahead distance d to obtain a normalized error: $(\epsilon(t)/d(t))$, (2) integrating the normalized error: $\Sigma(\epsilon(t)/d(t))$, and (3) multiplying the integrated error with a gain to generate the steering control command: $\delta(t)=k(t) \cdot \Sigma(\epsilon(t)/d(t))$. An actuator installed on the vehicle receives this steering control command and turns the steered wheels according to the steering control command so as to steer the vehicle to perform the maneuver.

Alternatively in another embodiment of the lateral control method, a target line is obtained in place of the target point and the distance from the predicted forward location of the vehicle to the target line is computed as the error term 40 in the steering control command $\delta(t)=k(t) \cdot \Sigma(\epsilon(t)/d(t))$. In this embodiment, a target line is obtained ahead of the vehicle based on a maneuver the vehicle is performing. When the vehicle is performing a lane keeping maneuver, this target line is at an offset (including zero offset) to the centerline of the lane the vehicle is traveling in. (When the offset is zero, the target line is the centerline of the lane the vehicle is traveling in.) When the vehicle is performing a lane keeping maneuver, the target line is at an offset (including zero offset) to the centerline of the lane the vehicle is changing to. When the vehicle is performing a left turn maneuver or a right turn maneuver, the target line is at an offset (including zero offset) to the centerline of the lane the vehicle is turning to. When the vehicle is performing an obstacle avoidance maneuver, the target line is at an offset to the centerline of the lane the vehicle is traveling in and the offset is determined based on the size and location of the obstacle as well as the availability of the lanes to the left and right of the lane the vehicle is traveling in. The offset could be a position offset and/or an angle offset. When the offset is a position offset, the target line is parallel to the lane centerline with a distance (including zero distance) between the target line and the lane centerline. When the offset is an angle offset, the target line is located by rotating the lane centerline by the angle offset. When the offset includes both a position offset and an angle offset, the target line is located by first shifting the lane centerline by the position offset and then rotating the shifted line by the angle offset.

Figure 6:
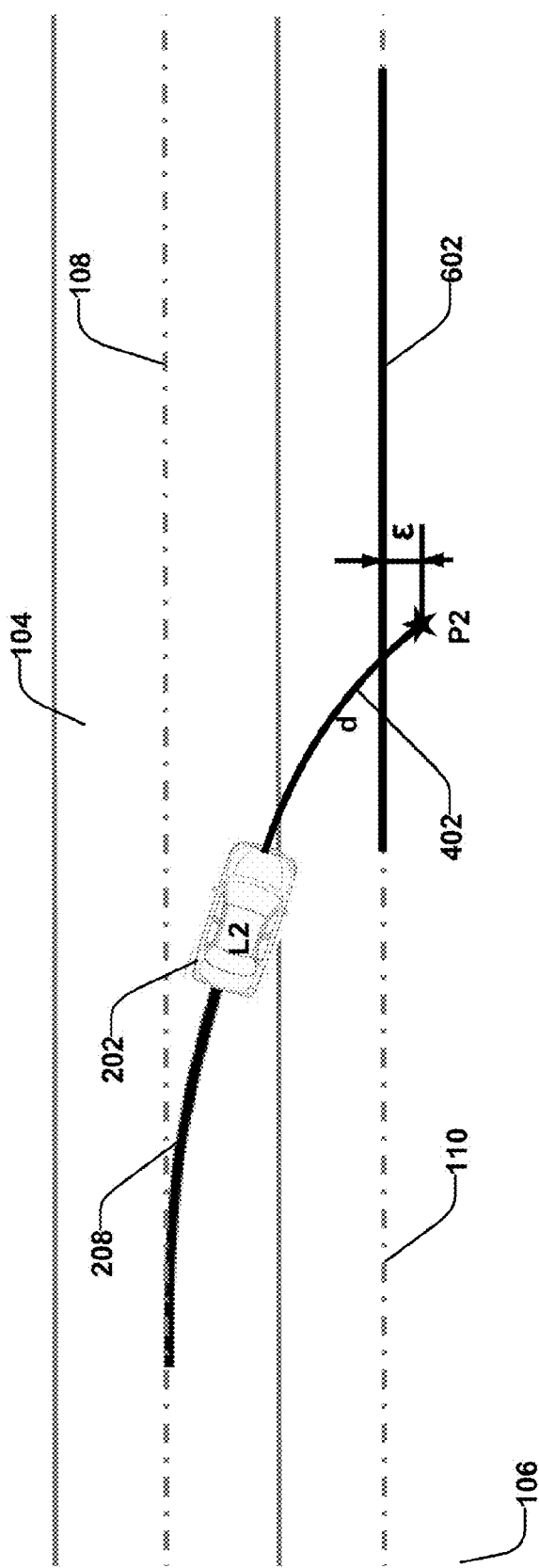
FIG. 6 shows the steering control that uses a target line at an offset to the centerline of the lane the vehicle is traveling in or changing to according to another embodiment of the present invention.

FIG. 6 illustrates one embodiment of the steering control method where the vehicle 202 is making a lane change from lane 104 to lane 106. The vehicle 202 is at location L2 in the middle of the lane change; therefore, the target line is at an offset (including zero offset) to the centerline 110 of lane 106, which is the lane the vehicle is changing to. In the embodiment shown in FIG. 6, the offset is a zero position offset and the target line 602 is at the lane centerline 110. The method then predicts a forward location, P2, of the vehicle at the look-ahead distance, d, ahead of the vehicle similar to that illustrated in FIG. 4. The look-ahead distance can be determined based on at least one of the following: vehicle speed, vehicle rotating speed, vehicle lateral acceleration, vehicle steering angle, a curvature of the lane, the normalized error, the distance from the forward location to the target line, the maneuver, and the location and size of the obstacle if the maneuver is obstacle avoidance. The method then determines the distance from the forward location P2 to the target line 602 as the error term $\epsilon(t)$. The method further computes a normalized error by dividing the error with the look-ahead distance: $\epsilon(t)/d(t)$, integrates the normalized error, and multiplies the integration with a gain to determine the steering control command: $\delta(t)=k(t)\cdot\Sigma(\epsilon(t)/d(t))$. The steering actuator on board the vehicle then turns the steered wheels of the vehicle according to the steering control command so as to steer the vehicle to perform the maneuver.

Figure 7:
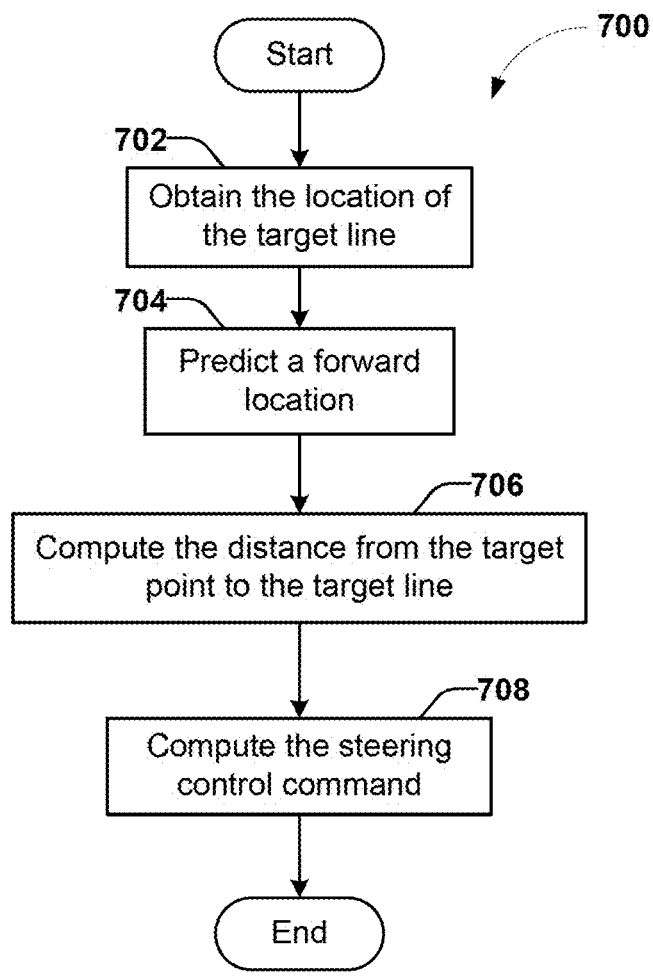
FIG. 7 is a flowchart showing the process involved in one embodiment of the steering control based on the target line.

FIG. 7 is a flowchart showing the process involved in one embodiment of the steering control based on the target line. Unlike the process in FIG. 5, the process 700 obtains the location of a target line (instead of a target point) based on the maneuver the vehicle is performing in step 702. The process 700 obtains the location of the target line by first locating the target line based on the maneuver the vehicle is performing and then computing the location of the target line based on the lane centerline and the offset (including zero offset) between the target line and the lane centerline. The process 700 then determines a look-ahead distance and predicts the forward location of the vehicle at the look-ahead distance ahead the vehicle in step 704. In step 706, the process 700 computes the distance from the forward location to the target line. Subsequently in step 708, the process 700 computes the steering control command by normalizing the error term 40, integrating the normalized error $\epsilon(t)/d(t)$, and multiplying the integration with a gain: $\delta(t)=k(t)\cdot\Sigma(\epsilon(t)/d(t))$.

Figure 8:
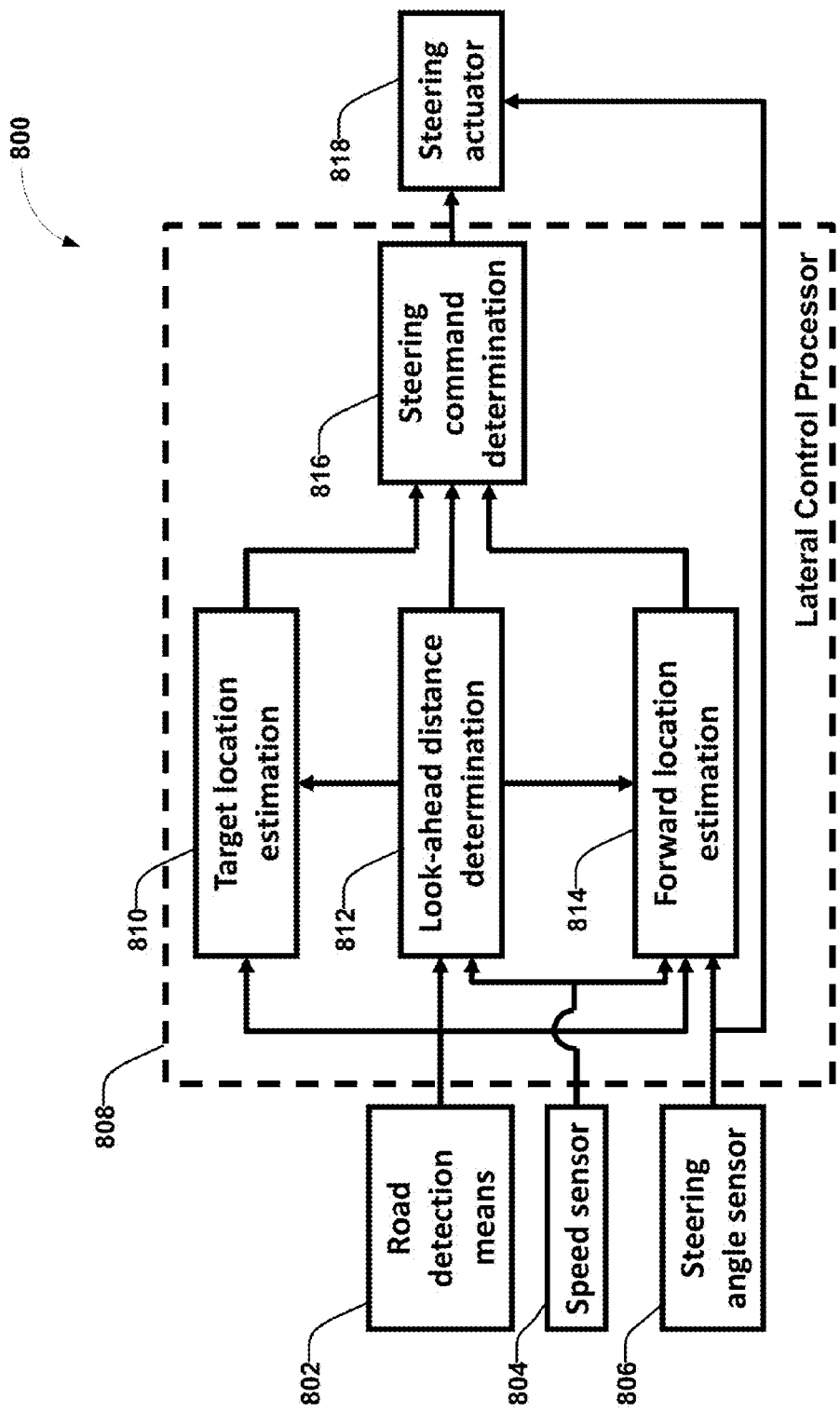

FIG. 8 shows a block diagram of a lateral control system 800 installed on a vehicle, which includes steered wheels, for controlling the steering of the vehicle. The lateral control system 800 includes a road detection means 802 that provides information of the road in front of the vehicle, a speed sensor 804 for providing a vehicle speed signal, a steering angle sensor 806 for providing a steering angle signal, a lateral control processor 808 for determining a steering angle command, and at least one steering actuator 818 for turning the steered wheels according to the steering angle command so as to steer the vehicle to perform specified maneuvers.

In one embodiment, the road detection means 802 comprises an image sensor for taking an image of the view ahead of the vehicle and an image processing unit for calculating a road shape from the image taken by the image sensor. For example, the road can be defined by the lane markings, which form (straight or curved) lines. Those (straight or curved) lines can be represented mathematically as equations, such as polynomial equations. Therefore, in one embodiment, the image processing unit identifies the lane markings from the images taken by the image sensor and determines the parameters of the polynomial equations based on the identified lane markings. Thus, the road information provided by the road detection means 802 consists of polynomial parameters for the lane markings, typically the left and right lane markings of the lane the vehicle is traveling in.

In another embodiment, the road detection means 802 comprises a satellite navigation system (such as a global positioning system (GPS), GLONASS, Galileo positioning system, and Beidou Navigation Satellite System) for determining a location of the vehicle, a digital map containing road information, and a processing unit for mapping the location of the vehicle into the digital map and providing the road information ahead the location of the vehicle. The satellite navigation system provides the location of the vehicle in a geographic coordinate system (such as longitude, latitude, and altitude coordinate system). By mapping this location to a digital map, the processing unit can identify the vehicle's location in the map and retrieve the surrounding road information accordingly. The road information can include road heading, road curvature, lane position, number of lanes, lane width, node position, distance between road junctions, and so on.

In a third embodiment, the road detection means 802 comprises a laser scanner and a processing unit to provide road information. The laser scanner sends laser pulses and captures lights reflected from objects in front of the vehicle; the processing unit determines the distances between the vehicle and the obstacles based on the time-of-flight principle. Due to the high reflectivity of the lane markings, the rate of measurements (i.e., reflected lights captured) at lane markings with respect to all measurements at ground is generally higher. Thus, the processing unit can detect the lane markings based on the rate of the reflected lights. Accordingly, the lane markings (i.e., straight or curved lines) can be represented with equations such as polynomial equations, and the processing unit then computes the parameters for the polynomial based on the detected lane markings. The road information then consists of polynomial parameters for the lane markings, typically the left and right lane markings of the lane the vehicle is traveling in.

The lateral control processor 808 is connected to the road detection means 802, the speed sensor 804, and the steering angle sensor 806 to receive the road information, the vehicle speed signal, and the steering angle signal, respectively. Depending on the location of the steering angle sensor, the steering angle signal is the steering angle at tire, the steering angle at the hand wheel, or the steering angle of a shaft in the steering system between the hand wheel and the tire.

The lateral control processor 808 employs a process similar to the process 500 shown in FIG. 5 to determine a steering angle command. The lateral control processor 808 first determines a look-ahead distance, d, in module 812. As described in step 502 of FIG. 5, the look-ahead distance is determined based on at least one of the following information: vehicle speed, vehicle yaw rate, vehicle lateral acceleration, vehicle steering angle, a curvature of the lane, the normalized error, the distance between the target point and the forward location, the distance to the lane boundary if the vehicle is conducting a lane-keeping maneuver, a maneuver the vehicle is performing, and the location of the obstacle if the maneuver is obstacle avoidance.

In module 810, the lateral control processor 808 estimates the location of the target point, which is located at an offset (including zero offset) to a lane centerline and at the look-ahead distance ahead of the vehicle. In one embodiment, the lateral control system 800 performs only lane keeping, thus, the lane centerline is always the centerline of the lane the vehicle is traveling in. (In other embodiments, the lateral control system 800 performs various maneuvers including lane keeping, lane changes, left/right turns, and obstacle avoidance; the details of this embodiment will be described later together with FIG. 10.)

In one embodiment, to estimate the location of the target point, the lateral control processor 808 first estimates the lane centerline based on the road information from the road detection means 802. As described earlier, when an image or laser scanner based road detection means is used, the road information includes road shapes, i.e., equations representing the left and/or right lane markings. The lane centerline can then be represented with the same type of equations (e.g., polynomial equations) and the parameters of the equation are estimated based on the equations for the left and/or right lane markings. When a satellite-navigation-system-based road detection means is used, the road information includes road heading and curvature, lane position, number of lanes, lane width, etc. The lane centerline can be estimated as an arc whose radius is 1 over the road curvature and tangent direction is the road heading. The starting point of the arc is the center of the lane the vehicle is in. With either type of the road detection means, the lane centerline is estimated as an equation representing the (straight or curved) centerline.

The lateral control processor 808 then calculates the location of the target point based on the lane centerline and the look-ahead distance. Essentially, the calculation involves solving the equation for the lane centerline (e.g., f(x, y)=0) and the equation representing the look-ahead distance (i.e., $x^2+y^2=d^2$). The solution (i.e., (Tx, Ty)) ahead of the vehicle (i.e., Tx>0) is the location of the target point. In this embodiment, the target point is located on the lane centerline and at the look-ahead distance ahead of the vehicle. In another embodiment, the target point can be located at an offset to the lane centerline and at the look-ahead distance ahead of the vehicle. In such an embodiment, the calculation involves solving the equation for the offset centerline (e.g., f(x, y, m)=0, where m is the offset) and the equation representing the look-ahead distance ($x^2+y^2=d^2$).

In another embodiment, the lateral control processor 808 directly estimates an offset lane centerline from the road information, e.g., the equations for the left and/or right lane markings, without estimating the lane centerline. The lateral processor 808 then calculates the location of the target point by solving the equation for the offset lane centerline and the equation representing the look-ahead distance.

In module 814, the lateral control processor 808 further predicts a forward location of the vehicle based on the steering angle signal and the look-ahead distance. In one embodiment, the prediction is based on the assumption that the vehicle keeps its current speed and rotating speed (i.e. yaw rate); that is, the vehicle will travel along an arc with a constant radius. The radius of the arc is estimated based on a geometric relationship with the steering angle: R=L/tan (δ)=L/tan(α×$δ_{meas}$) where L is the wheelbase of the vehicle, δ is the steering angle at tire, $δ_{meas}$ is the steering angle measurement from the steering angle sensor, and a is a ratio between the steering angle at tire and the steering angle measurement. The value of a depend on where the steering angle sensor is installed (e.g., on the steering column or from the power steering unit) and is known once the location of the steering angle sensor is decided.

In another embodiment, a vehicle model is used to estimate the rotating speed based on the steering angle. One example of the vehicle model is the well-known bicycle model, in which the vehicle rotating speed is a state of the model and the vehicle speed is a model parameter. The model takes the steering angle as the input and estimates the vehicle rotating speed as one of the states. With the vehicle dynamic model, a time series of the vehicle rotating speed (i.e., ω(t) to ω(t+T)) can be estimated with the assumption that the vehicle keeps its current speed (v(t)) and the current steering angle (δ(t)) for the time period of [t, t+T], where T can be determined as d(t)/v(t). That is, T is the time the vehicle takes to travel the look-ahead distance d(t). Thus, the forward location of the vehicle can be determined based on the vehicle speed and the estimated vehicle rotating speed through the following equations.

$$x(t_{k+1})=x(t_k)+v(t)\cdot(t_{k+1}-t_k)\cdot\cos(\theta(t_k));$$

$$y(t_{k+1})=y(t_k)+v(t)\cdot(t_{k+1}-t_k)\cdot\sin(\theta(t_k));$$

$$\theta(t_{k+1})=\theta(t_k)+\omega(t_k)\cdot(t_{k+1}-t_k)$$

The initial states for the model is $(x(t_0), y(t_0), \theta(t_0))=(0, 0, 0)$ as the coordinates are fixed at the vehicle. Note that in this embodiment, the velocity is always v(t) since it is assumed that the vehicle will maintain its current speed during the time period [t, t+T]. In another embodiment, the velocity can be predicted based on the current acceleration a(t) or a profile of the acceleration during the time period [t, t+T]. Then the forward location of the vehicle is predicted based on the following equations.

$$x(t_{k+1})=x(t_k)+v(t_k)\cdot(t_{k+1}-t_k)\cdot\cos(\theta(t_k));$$

$$y(t_{k+1})=y(t_k)+v(t_k)\cdot(t_{k+1}-t_k)\cdot\sin(\theta(t_k));$$

$$\theta(t_{k+1})=\theta(t_k)+\omega(t_k)\cdot(t_{k+1}-t_k)$$

$$v(t_{k+1})=v(t_k)+a(t_k)\cdot(t_{k+1}-t_k)$$

In one embodiment, the starting point of the arc is the vehicle current location and the tangent line of the arc is the vehicle heading. As the target point is estimated in vehicle-fixed coordinates, the vehicle current location is (0, 0) and the tangent line is in the x axis in this vehicle-fixed coordinates. Thus, the arc can be uniquely defined by a function g(x,y)=0. Accordingly, the forward location at the look-ahead distance can be determined by solving equations g(x,y)=0 and $x^2+y^2=d^2$. The solution (Px, Py) with Px>0 is the forward location.

With the target location (Tx, Ty), the forward location (Px, Py), and the look-ahead distance d determined, the lateral control processor 808 then computes the steering command in module 816. The processor 808 first calculates a distance between the location of the target point and the forward location: $\epsilon=\text{sqrt}((Tx-Px)^2+(Ty-Py)^2)$, and then computes a normalized error by dividing the distance with the look-ahead distance (ϵ/d), and then integrates the normalized error: Σ(ϵ/d). The steering angle command is then determined by multiplying the integrated error with a gain: δ=k·Σ(ϵ/d).

Since both the distance c and the look-ahead distance d are not fixed values, it is appropriate to represent the steering command as δ(t)=k·Σ(ϵ(t)/d(t)). In a further embodiment, the lateral control processor 808 further adjusts the gain k based on at least one of the following: the distance ϵ, the look-ahead distance d, the normalized error ϵ/d, the vehicle speed, the steering angle, and the road curvature. Thus, the gain k is also a variable and the steering command can be represented as δ(t)=k(t)·Σ(ϵ(t)/d(t)). In one embodiment, the lateral control processor 808 reduces the gain k when the normalized error ϵ/d is larger than a threshold or when there is a large change in the normalized error. In another embodiment, the lateral control processor 808 increases the gain k when the steering angle is relatively large, e.g., larger than a threshold. Similarly, the lateral control processor 808 may increase the gain k when the road curvature is relatively large. (The lateral control processor 808 can derive the road curvature from the lane centerline equations. Alternatively, when the satellite-navigation-system-based road detection means 802 is used, the lateral control processor 808 obtains the road curvature directly from the road information provided by the road detection means 802.)

After determining the steering command in module 816, the lateral control processor outputs the steering command to the steering actuator 818. The steering actuator 818 then turns the steered wheels according to the steering command $\delta$ so as to keep the vehicle in the lane. In one embodiment, the steered wheels are the front wheels of the vehicle, and the steering actuator 818 turns the front wheels of the vehicle according to the steering command $\delta$. In another embodiment, the steered wheels include both the front wheels and the rear wheels, and the lateral control system 800 includes two steering actuators, a front actuator for turning the front wheels and a rear actuator for turning the rear wheels. The front actuator turns the front wheels to an angle $\delta_f$ and the rear actuator turns the rear wheels to an angle $\delta_r$, where the two angles satisfy: $\delta_f - \delta_r = \delta$. In one embodiment, the two angles, $\delta_f$ and $\delta_r$, satisfy a relationship $\delta_r = (c/(L-c)) \cdot \delta_f$ where L is the wheelbase and $0 < c < L$. Thus, by solving the two equations ($\delta_f - \delta_r = \delta$ and $\delta_r = (c/(L-c)) \cdot \delta_f$), the two actuators determine the corresponding angle they need to turn the front and rear steered wheels.

Figure 9:
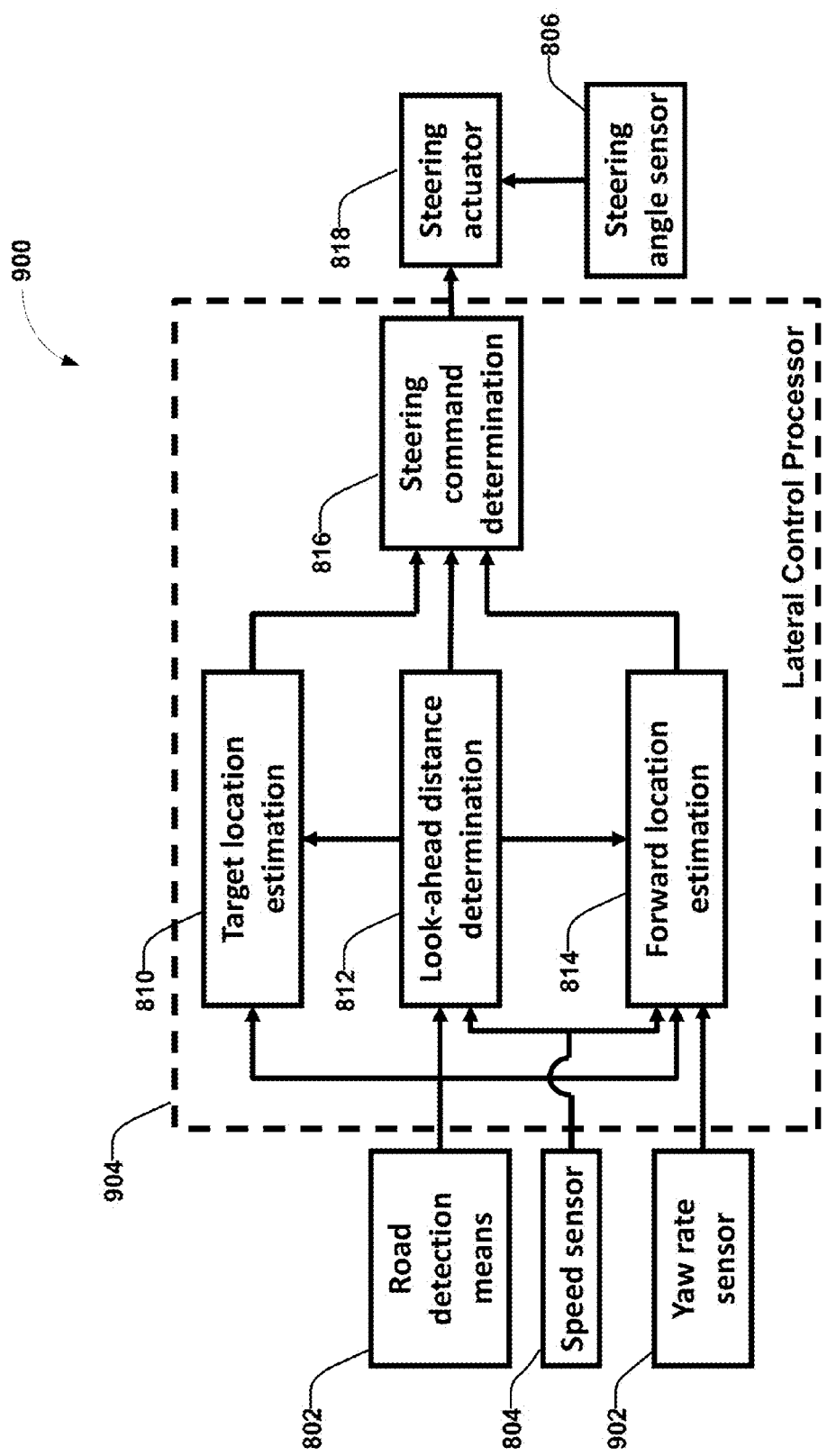

FIG. 9 shows a block diagram of a lateral control system 900 installed on a vehicle, which includes steered wheels, for controlling the steering of the vehicle. This embodiment of the lateral control system differs from the system 800 in FIG. 8 in that a rotating speed sensor 902 (i.e., a yaw rate sensor) is used to measure the rotating speed of the vehicle and the lateral control processor 904 uses the rotating speed signal from the rotating speed sensor 902 to predict the forward location of the vehicle in module 814. The lateral control processor 904 predicts the forward location by assuming the vehicle keeps its current speed and rotating speed; that is, the vehicle travels along an arc with a constant radius. With the speed signal from the speed sensor 804 and the rotating speed signal from the rotating speed sensor 902, the radius of the arc, R, can be determined as R=v/$\omega$, where v is the vehicle speed and $\omega$ is the rotating speed. The starting point of the arc is the vehicle current location and the tangent of the arc at the starting point is the vehicle heading. In one embodiment, the vehicle-fixed coordinates are used; accordingly, the starting point of the arc is (0,0) and the tangent line is the x axis. Hence, the arc is uniquely defined by the radius and the forward location (Px, Py) is computed by solving the equation representing the arc, g(x,y)=0 and the look-ahead distance $x^2+y^2=d^2$.

Figure 10:
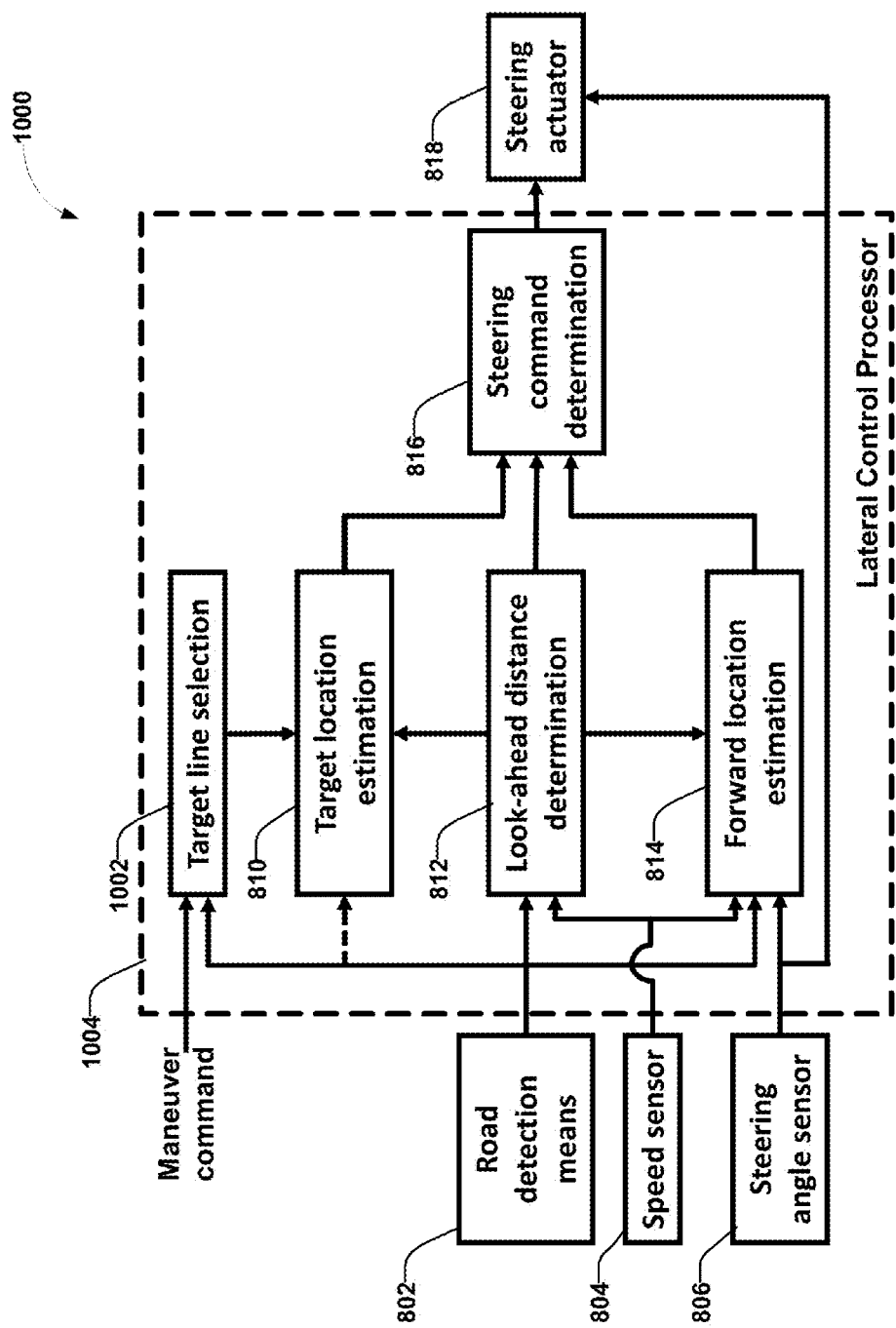
FIG. 10 shows the block diagram of a steering control system on board a vehicle, which automatically steers the vehicle to perform various maneuvers.

The lateral control systems 800 and 900 in FIG. 8 and FIG. 9 perform the lane keeping function and the target points are always located at an offset (including zero offset) to the centerline of the lane the vehicle is in. FIG. 10 shows the block diagram of a steering control system 1000 on board a vehicle, which automatically steers the vehicle to perform various maneuvers. Compared with the lateral control system 800 in FIG. 8, the lateral control system 1000 is further connected with a unit (not shown) to receive a maneuver command and the lateral control processor 1004 determines the steering command so as to execute the maneuver. The unit that provides the maneuver command could be an autonomous decision unit that receives a source location and a destination (e.g., from the driver), determines a route between the source location and the destination, monitors the surrounding driving conditions, and makes decisions on the maneuvers the vehicle needs to perform so as to follow the route and maintain safety.

To execute the specified maneuver (e.g., lane keeping, lane changes, left turns, right turns, obstacle avoidances), the lateral control processor 1004 further consists of a target line selection module 1002, which selects a target line based on the maneuver command and the road information from the road detection means 802. The target line is at an offset (including zero offset) to the centerline of the lane the vehicle is traveling in or changing to depending on the maneuver command. For example, if the maneuver command is lane keeping, the target line is at an offset (including zero offset) to the centerline of the lane the vehicle is in. If the maneuver command is a lane change to the left (or right), the target line is at an offset (including zero offset) to the centerline of the lane to the left (or right) of the vehicle. If the maneuver command is a left (or right) turn, the target line is at an offset (including zero offset) to the centerline of the lane the vehicle is turning to. If the maneuver command is obstacle avoidance using the left (or right) lane, the target line is at an offset (including zero offset) to the centerline of the left (or right) lane. As the lane centerline can be straight or curved, the target line can be a straight line or a curved line accordingly.

In one embodiment, the offset is a position offset and the target line is therefore parallel to the lane centerline. When this position offset is zero, the target line is the centerline. In a further embodiment, the lateral control processor 1004 changes the offset (over time) based on the driving scenarios and conditions. For example, the lateral control processor 1004 can increases the offset as the vehicle goes into a curve, maintains a constant offset as the vehicle negotiates the curve, and reduces the offset as the vehicle goes out of the curve. The benefit of such a dynamic offset is that it allows the vehicle to cut corner on the curve and as a result travel along a milder curve.

In another embodiment, the offset is an angle offset and the target line is located by rotating the identified centerline by the angle offset. In yet another embodiment, the offset includes both a position offset and an angle offset, and the target line is located by first shift the lane centerline by the position offset and then rotating the shifted line by the angle offset.

In one embodiment, the lateral control processor 1004 further computes the equations that represent the target line in module 1002 and then estimates the target point location by solving these equations together with the equation for the look-ahead distance (i.e., $x^2+y^2=d^2$). In another embodiment, the module 1002 simply outputs the target line decision as described above and the module 810 computes the equations for the target line and then estimates the target point location. In either embodiment, the equations of the target line are determined based on the road information from the road detection means in a similar way as described with FIG. 8. With the target point located at different target lines for different maneuvers, the resulting steering command will then be used by the steering actuator to steer the vehicle so as to perform the different maneuvers.

Although the present invention has been described above with particularity, this was merely to teach one of ordinary skill in the art how to make and use the invention. Many additional modifications will fall within the scope of the invention, as that scope is defined by the following claims.

What is claimed is:

1. A method for steering control of a vehicle having an actuator which turns steered wheels of the vehicle, comprising:

obtaining a location of a target point at a look-ahead distance away from the vehicle;

predicting a forward location of the vehicle, wherein the forward location is at the look-ahead distance away from the vehicle;

determining an error as a distance between the location of the target point and the forward location;

computing a normalized error by dividing the error with the look-ahead distance;

determining a steering control command based on an integration of the normalized error; and outputting the steering control command to the actuator, wherein the actuator turns the steered wheels according to the steering control command so as to steer the vehicle to perform various maneuvers.

2. The method of claim 1 determining the look-ahead distance based on at least one of the following: vehicle speed, vehicle rotating speed, vehicle lateral acceleration, vehicle steering angle, a curvature of the lane, a distance to a lane boundary, a distance to an obstacle, the normalized error, the distance between the location of the target point and the forward location, and the maneuver.

3. The method of claim 1, wherein the look-ahead distance is a linear function of vehicle speed.

4. The method of claim 1 obtaining the location of the target point by locating the target point based on a maneuver the vehicle is performing, wherein the target point is located at an offset, including zero offset, to a lane centerline of the lane the vehicle is traveling in when the vehicle is performing a lane keeping maneuver;

the target point is located at an offset, including zero offset, to a lane centerline of the lane the vehicle is changing to when the vehicle is performing a lane change maneuver;

the target point is located at an offset, including zero offset, to a lane centerline of the lane the vehicle is turning to when the vehicle is performing a left turn maneuver or a right turn maneuver; and computing the location of the target point based on the lane centerline, the offset, and the look-ahead distance.

5. The method of claim 1 predicting the forward location of the vehicle by assuming that the vehicle maintains its current speed and rotating speed while traveling the look-ahead distance, wherein the current rotating speed is determined based on at least one of the following: vehicle current yaw rate and vehicle current steering angle.

6. The method of claim 1 predicting the forward location of the vehicle by assuming the vehicle maintains its current speed and steering angle while traveling the look-ahead distance.

7. A method for steering control of a vehicle having an actuator which turns steered wheels of the vehicle, comprising:

obtaining a target line ahead of the vehicle based on a maneuver the vehicle is performing;

predicting a forward location of the vehicle, wherein the forward location is at the look-ahead distance away from the vehicle;

determining an error as a distance from the forward location to the target line;

computing a normalized error by dividing the error with the look-ahead distance;

determining a steering control command based on an integration of the normalized error;

outputting the steering control command to the actuator, wherein the actuator turns the steered wheels according to the steering control command so as to steer the vehicle to perform the maneuver.

8. The method of claim 7 determining the look-ahead distance based on at least one of the following: vehicle speed, vehicle rotating speed, vehicle lateral acceleration, vehicle steering angle, a curvature of the lane, a distance to a lane boundary, a distance to an obstacle, the normalized error, the distance from the forward location to the target line, and the maneuver.

9. The method of claim 7 obtaining the target line by locating the target line based on the maneuver, wherein the target line is at an offset, including zero offset, to a lane centerline of the lane the vehicle is traveling in when the vehicle is performing a lane keeping maneuver;

the target line is at an offset, including zero offset, to a lane centerline of the lane the vehicle is changing to when the vehicle is performing a lane change maneuver;

the target line is at an offset, including zero offset, to a lane centerline of the lane the vehicle is turning to when the vehicle is performing a left turn maneuver or a right turn maneuver; and computing the location of the target line based on the lane centerline and the offset.

10. A lateral control system installed on a vehicle including steered wheels for controlling the steering of the vehicle, comprising:

a road detection means that provides information of the road in front of the vehicle;

a speed sensor for providing a vehicle speed signal;

a steering angle sensor for providing a steering angle signal;

a processor, connected to the road detection means to receive the information of the lane and connected to the speed sensor and the steering angle sensor to receive the vehicle speed signal and the steering angle signal, for computing a steering angle command by determining a look-ahead distance, computing a location of a target point at the look-ahead distance ahead the vehicle, predicting a forward location of the vehicle, calculating an error as a distance between the location of the target point and the forward location, computing a normalized error by dividing the error with the look-ahead distance, and integrating the normalized error; and at least one steering actuator for turning the steered wheels according to the steering angle command so as to steer the vehicle to perform the maneuver.

11. The lateral control system in claim 10, wherein the road detection means comprises an image sensor for taking an image of the view ahead of the vehicle and an image processing unit for calculating a road shape as the road information from the image taken by the image sensor.

12. The lateral control system in claim 10, wherein the road detection means comprises a satellite navigation system for determining a location of the vehicle, a digital map, and a processing unit for mapping the location of the vehicle into the digital map and providing the road information ahead the location of the vehicle.

13. The lateral control system in claim 10, wherein the road detection means comprises a laser scanner for sending laser pulses and capturing lights reflected from objects in front of the vehicle and a processing unit for determining a road shape as the road information from the reflected lights.

14. The lateral control system in claim 10, wherein the processor determines the look-ahead distance based on at least one of the following: vehicle speed, vehicle yaw rate, vehicle lateral acceleration, vehicle steering angle, a curvature of the lane, a distance to a lane boundary, a distance to an obstacle, the normalized error, the distance between the target point and the forward location, and a maneuver the vehicle is performing.

15. The lateral control system in claim 10, wherein the processor determines the location of the target point by
estimating a lane centerline based on the road information from the road detection means,
calculating the location of the target point based on the lane centerline and the look-ahead distance, wherein the target point is located at an offset, including zero offset, to the lane centerline and at the look-ahead distance ahead of the vehicle.

16. The lateral control system in claim 10, wherein the processor predicts the forward location of the vehicle by first estimating a vehicle rotating speed based on the steering angle signal and then computing the forward location based on the vehicle speed signal, the vehicle rotating speed, and the look-ahead distance.

17. The lateral control system in claim 10 further comprising a rotating speed sensor for providing a rotating speed signal of the vehicle, wherein the processor predicts the forward location of the vehicle based on the speed signal from the speed sensor and the rotating speed signal from the rotating speed sensor.

18. The lateral control system in claim 10 further connected to a maneuver decision unit installed on the vehicle, wherein the processor
receives a maneuver command from the maneuver decision unit, wherein the maneuver command comprises at least one of the following commands: lane keeping, lane changing, left turn, right turn, and avoiding an obstacle;
selects a target line based on the maneuver command, wherein the target point is located on the target line; and
computes the location of the target point based on the target line and the look-ahead distance.

* * * * *